United States Patent
Kim et al.

(10) Patent No.: US 9,753,209 B2
(45) Date of Patent: Sep. 5, 2017

(54) LIGHT GUIDE PLATE, AND BACKLIGHT UNIT AND DISPLAY DEVICE INCLUDING THE SAME

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Gyeonggi-do (KR)

( * ) Notice: Subject to any disclaimer, the term of this patent is extended or adjusted under 35 U.S.C. 154(b) by 15 days.

(21) Appl. No.: 14/828,648

(22) Filed: Aug. 18, 2015

(65) Prior Publication Data
US 2016/0047971 A1    Feb. 18, 2016

Related U.S. Application Data

(60) Provisional application No. 62/038,723, filed on Aug. 18, 2014.

(30) Foreign Application Priority Data

Mar. 31, 2015 (KR) .................. 10-2015-0045733

(51) Int. Cl.
*F21V 8/00* (2006.01)

(52) U.S. Cl.
CPC ......... *G02B 6/0045* (2013.01); *G02B 6/0055* (2013.01); *G02B 6/0036* (2013.01); *G02B 6/0065* (2013.01)

(58) Field of Classification Search
CPC .. G02B 6/0055; G02B 6/0045; G02B 6/0036; G02B 6/0065
See application file for complete search history.

(56) References Cited

U.S. PATENT DOCUMENTS

| | | | | |
|---|---|---|---|---|
| 2005/0270802 A1* | 12/2005 | Hsu | .................. | G02F 1/133615 362/626 |
| 2008/0025688 A1* | 1/2008 | Lee | .................. | G02B 6/0038 385/146 |
| 2009/0268484 A1* | 10/2009 | Kim | .................. | G02B 6/0036 362/608 |
| 2009/0316433 A1* | 12/2009 | Shim | .................. | G02B 6/0038 362/613 |
| 2010/0302479 A1* | 12/2010 | Aronson | .......... | B29D 11/00326 349/64 |
| 2011/0149595 A1* | 6/2011 | Lin | .................. | G02B 6/0036 362/606 |
| 2013/0242612 A1* | 9/2013 | Lee | .................. | G02B 6/0036 362/613 |

* cited by examiner

*Primary Examiner* — Anh Mai
*Assistant Examiner* — Fatima Farokhrooz

(57) ABSTRACT

Provided are a light guide plate, and a backlight unit and a display device including the same. The light guide plate includes a light output surface configured to output light to the outside, a reflective surface positioned opposite the light output surface, a light incident surface provided on at least one side surface of side surfaces which connect the light output surface and the reflective surface, and configured to receive light projected from a light source, and a reflection pattern having an embossed portion formed to protrude to the outside of the reflective surface and a concave portion having a ring shape which surrounds the embossed portion and recessed in the reflective surface, wherein the embossed portion has a recessed region.

8 Claims, 13 Drawing Sheets

# LIGHT GUIDE PLATE, AND BACKLIGHT UNIT AND DISPLAY DEVICE INCLUDING THE SAME

RELATED APPLICATIONS

This application claims the benefit of priority of both U.S. Provisional Patent Application No. 62/038,723 filed on Aug. 18, 2014, and Korean Patent Application No. 10-2015-0045733 filed on Mar. 31, 2015. The contents of the above applications are all incorporated by reference as if fully set forth herein in their entirety.

FIELD AND BACKGROUND OF THE INVENTION

The present invention relates to a light guide plate, a backlight unit and a display device including the same, and more particularly, a light guide plate capable of improving a light diffusion degree, and a backlight unit and a display device including the same.

As a backlight unit (BLU) is one type of light source devices which supply light to the rear surface of a screen of each liquid crystal display (LCD) device, the BLU influences image qualities, such as the luminance of an image, color reproducibility, a viewing angle, a contrast range, legibility, etc., power consumption, a product lifetime, etc., and is a core component which accounts for approximately 20 to 50% of an overall cost of the LCD device.

The BLU is largely classified as a direct-lit type and an edge-lit type according to an arrangement position of a light source. The direct-lit type uses light projected from the light source disposed in the direct rear of a screen light and moved in a direction of a liquid crystal panel, but the edge-lit type supplies light to a display panel by guiding light projected from a light source disposed on an edge of a screen in a side direction to a liquid crystal panel using a light guide plate. Due to a structural difference between the direct-lit type and the edge-lit type, the direct-lit type has advantages for luminance, a contrast range, screen uniformity, image reproducibility, etc., and the edge-lit type has advantages for a product thickness and costs.

Recently, edge-lit type backlights having an advantage of a product exterior have been increasingly important in the display industry because a display product becomes more important for the value of an indoor interior decoration. Particularly, the trend of consumer demands for ultra-thin display products is increasing and studies for reducing diffusion sheets, about 3 to 5 diffusion sheets disposed in the rear of a display panel, as much as possible are actively conducted according to the trend. This type of the display product has problems that a light diffusion degree thereof is difficult to secure as much as that of existing diffusion sheets and a hot spot is issued due to the light diffusion degree. Therefore, the development of a light guide plate capable of improving the light diffusion degree is emerging as a key technology.

SUMMARY OF THE INVENTION

The present invention is directed to providing a light guide plate capable of improving a light diffusion degree, and a backlight unit and a display device including the same.

The present invention is also directed to providing a light guide plate capable of suppressing a hot spot, and a backlight unit and a display device including the same.

One aspect of the present invention provides a light guide plate including a light output surface configured to output light to the outside, a reflective surface positioned opposite the light output surface, a light incident surface provided on at least one side surface of side surfaces which connect the light output surface and the reflective surface, and configured to receive light projected from a light source, and a reflection pattern having an embossed portion formed to protrude to the outside of the reflective surface and a concave portion having a ring shape which surrounds the embossed portion and recessed in the reflective surface, wherein the embossed portion has a recessed region.

Another aspect of the present invention provides a backlight unit including a light source configured to project light and a light guide plate. Here, the light guide plate includes a light incident surface which faces the light source and receives light projected from the light source, a light output surface which is perpendicular to the light incident surface and outputs the light to the outside, and a reflective surface opposite the light output surface, and a reflection pattern provided on the reflective surface. Further, the reflection pattern includes an embossed portion protruding from the reflective surface and having a circular shape when viewed in a direction perpendicular to the reflective surface, and a concave portion recessed in the reflective surface and having a ring shape which surrounds the embossed portion when viewed in a direction perpendicular to the reflective surface. Further, the embossed portion has a recessed region.

According to the embodiment of the present invention, light is scattered by the recessed portion, and thus a degree of scattering or diffusion of light output from the light guide plate can be improved.

Further, according to the embodiment of the present invention, since the light guide plate capable of improving the degree of scattering is used, a hot spot can be improved.

DESCRIPTION OF SPECIFIC EMBODIMENTS OF THE INVENTION

Figure 1:
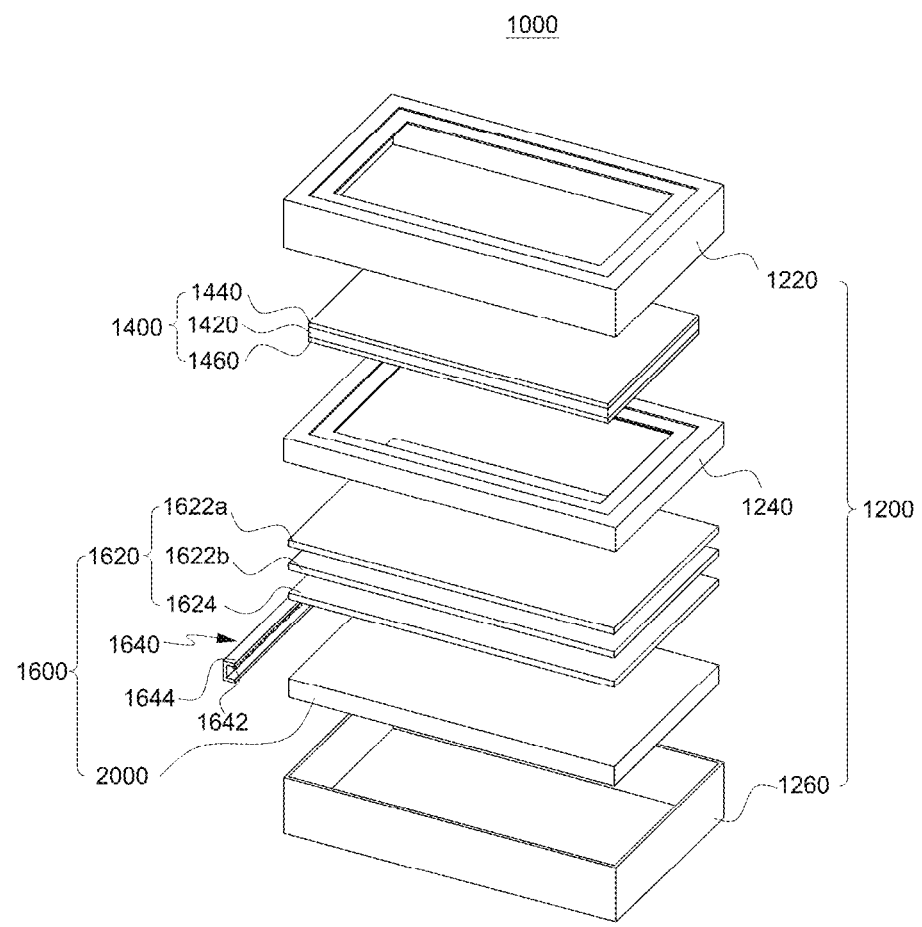
FIG. 1 is an exploded perspective view of a display device according to one embodiment of the present invention.

Hereinafter, a light guide plate according to one embodiment of the present invention, and a backlight unit and a display device including the same will be described with reference to the accompanying drawings in detail.

Further, the same or corresponding components may be assigned with the same or similar reference numerals regardless of drawing numerals and the repetitive description thereof will be omitted. The size and shape of each component shown for the sake of convenience of the description may be exaggerated or reduced.

One aspect of the present invention provides a light guide plate including a light output surface configured to output light to the outside, a reflective surface positioned opposite the light output surface, a light incident surface provided on at least one side surface of side surfaces which connect the light output surface and the reflective surface, and configured to receive light projected from a light source, and a reflection pattern having an embossed portion formed to protrude to the outside of the reflective surface and a concave portion having a ring shape which surrounds the embossed portion and recessed in the reflective surface. Here, the embossed portion has a recessed region.

In the recessed region, a length in a direction parallel to the light incident surface may be greater than a length in a direction perpendicular to the light incident surface.

In the recessed region, the length in the direction parallel to the light incident surface may be smaller than the length in the direction perpendicular to the light incident surface.

The recessed region may be in a shape having a major axis and a minor axis when viewed in a direction perpendicular to the reflective surface.

The recessed region may be formed in a substantially elliptical shape when viewed in the direction perpendicular to the reflective surface.

The major axis of the recessed region may pass through the center of the embossed portion when viewed in the direction perpendicular to the reflective surface.

The major axis of the recessed region may be separated from the center of the embossed portion in a predetermined distance when viewed in the direction perpendicular to the reflective surface.

In the embossed portion, a protruding height of one side and a protruding height of the other side may be different based on the recessed region in each cross sectional view perpendicular to the reflective surface and the major axis of the recessed region.

The major axis of the recessed region may be parallel to the light incident surface, and a side having the higher protruding height may be positioned close to the light incident surface.

The major axis of the recessed region may be perpendicular to the light incident surface.

The lowest point of the recessed region may be positioned higher than the reflective surface.

The recessed region may be formed in a substantially circular shape when viewed in the direction perpendicular to the reflective surface.

The reflection pattern may have a ring shape which surrounds the concave portion when viewed in the direction perpendicular to the reflective surface, and additionally include an outer portion protruding from the reflective surface to the outside.

Another aspect of the present invention provides a backlight unit including a light source configured to project light and a light guide plate. Here, the light guide plate includes a light incident surface which faces the light source and receives light projected from the light source, a light output surface which is perpendicular to the light incident surface and outputs the light to the outside, and a reflective surface opposite the light output surface, and a reflection pattern provided on the reflective surface. Further, the reflection pattern includes an embossed portion protruding from the reflective surface and having a circular shape when viewed in a direction perpendicular to the reflective surface, and a concave portion recessed in the reflective surface and having a ring shape which surrounds the embossed portion when viewed in a direction perpendicular to the reflective surface. Further, the embossed portion has a recessed region.

In the recessed region, a length in a direction parallel to the light incident surface may be greater than a length in a direction perpendicular to the light incident surface.

In the recessed region, the length in the direction parallel to the light incident surface may be smaller than the length in the direction perpendicular to the light incident surface.

The recessed region may be formed in an elliptical shape having a major axis and a minor axis when viewed in the direction perpendicular to the reflective surface.

In the embossed portion, a protruding height of one side and a protruding height of the other side may be different based on the recessed region in each cross sectional view perpendicular to the reflective surface and the major axis of the recessed region.

The major axis of the recessed region may be parallel to the light incident surface and a side having the higher protruding height may be positioned close to the light incident surface.

The lowest point of the recessed region may be positioned higher than the reflective surface.

Hereinafter, a display device 1000 according to one embodiment of the present invention will be described. Here, the display device 1000 should be interpreted as a concept including all of various display devices which output images in addition to liquid crystal display (LCD) devices, plasma display panel (PDP) display devices, and organic light-emitting diode (OLED) display devices. However, it will be described based on the LCD device 1000 for the sake of convenience of the description below.

Figure 2:
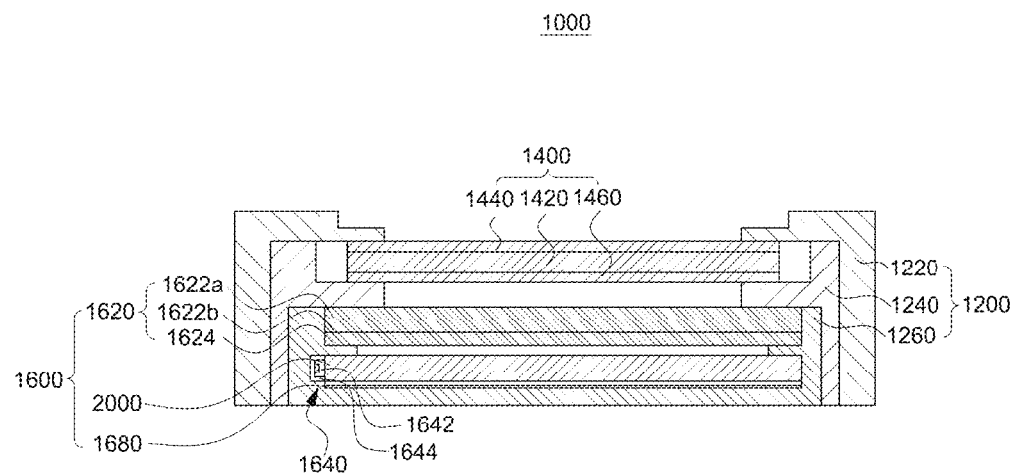
FIG. 2 is a cross-sectional view of the display device according to one embodiment of the present invention.

FIG. 1 is an exploded perspective view of the display device 1000 according to one embodiment of the present invention, and FIG. 2 is a cross-sectional view of the display device 1000 according to one embodiment of the present invention.

Referring to FIGS. 1 and 2, the display device 1000 may include a housing 1200, a display panel 1400, and a backlight unit 1600.

The housing 1200 accommodates the display panel 1400 and the backlight unit 1600 therein to protect from an external impact. Further, the housing 1200 serves to connect the display panel 1400 and the backlight unit 1600.

The housing 1200 may include a top case 1220, a guide frame 1240, and a bottom cover 1260. The top case 1220 and the bottom cover 1260 are coupled to respectively cover a front surface and a rear surface of the display device 1000, and the guide frame 1240 is mounted therebetween. The guide frame 1240 may fix the display panel 1400 with a bezel of the top case 1220 and may also fix a light guide plate 2000 and optical sheets 1620 with the bottom cover 1260.

The display panel 1400 displays an image using light supplied from the backlight unit 1600.

The display panel 1400 may include two transparent substrates and a liquid crystal layer 1420 interposed between the transparent substrates. Here, each of the transparent substrates may be a color filter substrate 1460 or a thin film transistor (TFT) substrate 1440. When an electrical signal is applied to the liquid crystal layer 1420 through a gate line and a data line of the TFT substrate 1440, the orientation of liquid crystals is changed, the liquid crystals selectively pass light projected from the backlight unit 1600 by pixel units, and the passed light is changed to color light by the color filter substrate 1460 to output an image. Here, the TFT substrate 1440 may be electrically connected with a panel driver (not shown), such as a chip-on-film (COF) or tape carrier package (TCP), through a printed circuit board (PCB) (not shown) and may receive a control signal.

The backlight unit 1600 supplies light to the rear of the display panel 1400 so that the display panel 1400 outputs an image.

The backlight unit 1600 may include an optical sheet 1620, a light source array 1640, a light guide plate 2000, and a reflective plate 1680.

The light source array 1640 may include a light source 1642 for generating light and a light source substrate 1644 on which the light source 1642 is installed. The light source 1642 may include a cold cathode fluorescent lamp (CCFL), an external electrode fluorescent lamp (EEFL), a light emitting diode (LED), etc. In the case of an edge-lit type backlight unit 1600, in order to project light to a side surface of the light guide plate 2000, the light source array 1640 may be installed on an edge of the display device 1000 so that light of the light source 1642 is projected in a side direction of the light guide plate 2000. In the case of a direct-lit type backlight unit 1600, the light source 1642 may be installed on the bottom cover 1260 to output light to the rear of the display panel 1400, and at this time, the light source substrate 1644 may be installed on the bottom cover 1260, or the light source substrate 1644 may be removed and the light source 1642 may be directly installed on the bottom cover 1260.

The light guide plate 2000 may be disposed to face a rear surface of the display panel 1400, in the edge-lit type backlight unit 1600. The light guide plate 2000 serves to guide light output in a side direction from the light source 1642 toward the display panel 1400. Further, patterns may each be formed on an upper surface, a lower surface, and a side surface of the light guide plate 2000, the side surface beside the light source 1642, to improve the uniformity of light such as improving luminance, hot spots, etc. Further, a material including poly methyl methacrylate (PMMA), methyl styrene (MS), methyl methacrylate (MMA), glass, or the like may be used for the material of the light guide plate 2000. The detailed description for the light guide plate 2000 will be described below. Meanwhile, in the case of the direct-lit type backlight unit 1600, a diffusion plate which diffuses light may be provided instead of the light guide plate 2000 which guides light.

The optical sheet 1620 is disposed to face the display panel 1400 in the rear of the display panel 1400, and when there is a light guide plate 2000, the optical sheet 1620 may be disposed between the display panel 1400 and the light guide plate 2000. An example of the optical sheet 1620 is a diffusion sheet 1624 or prism sheet 1622. The diffusion sheet 1624 improves the uniformity of light output dispersion because light output from the light guide plate 2000 or diffusion plate is evenly diffused, and the occurrence of a dark/bright pattern, such as a moire phenomenon, or hot spots may be reduced or removed. The prism sheet 1622 may adjust a path of light in a direction perpendicular to the display panel 1400. Light passed through the light guide plate 2000 or diffusion sheet 1624 disperses and moves in a forward direction and the prism sheet 1622 guides the dispersed light in a direction perpendicular to the display panel 1400, and thus the luminance and viewing angle of the display device 1000 can be improved. For example, as shown in FIGS. 1 and 2, in the optical sheet 1620, a vertical prism sheet 1622a, a horizontal prism sheet 1622b, and the diffusion sheet 1624 may be sequentially disposed from the display panel 1400. The arrangement order in the optical sheet 1620 does not have to be the same as the above-described order. That is, a part of the optical sheet 1620 may be removed or may use a number of sheets (e.g., two or more diffusion sheets 1624) and the order may be suitably changed if needed.

The reflective plate 1680 may be attached to the bottom cover 1260. The reflective plate 1680 may reflect light, which is output from the light source 1642 and moved in a rear direction, to the display panel 1400. Since the reflective plate 1680 reflects the light moved in a direction of a rear surface of the light guide plate 2000 or diffusion plate to the display panel 1400, the loss of light is reduced, and thus the overall luminance of the display is improved.

Hereinafter, the light guide plate 2000 according to one embodiment of the present invention will be described in more detail.

Figure 3:
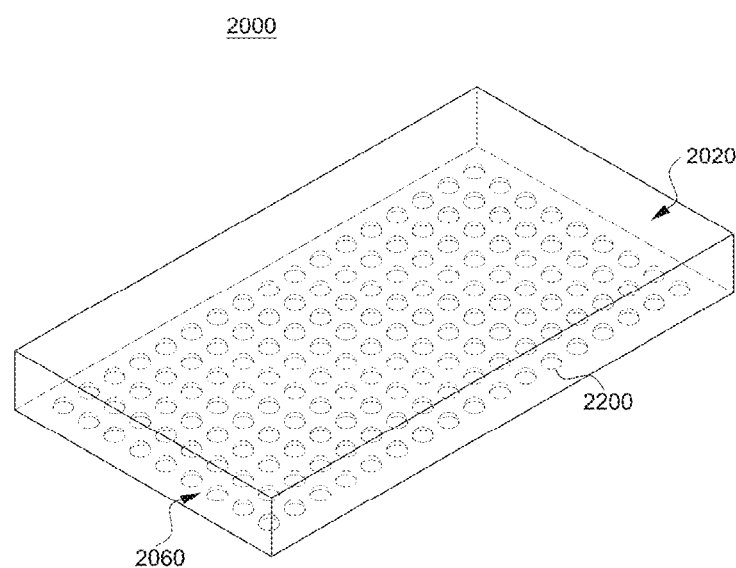
FIG. 3 is a perspective view of a light guide plate according to one embodiment of the present invention.
Figure 4:
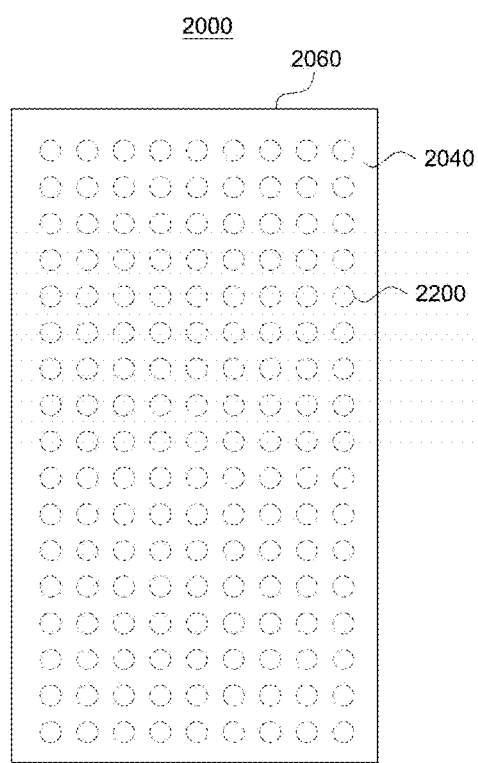
FIG. 4 is a rear view of the light guide plate in which the density of reflection patterns according to one embodiment of the present invention is uniform.
Figure 5:
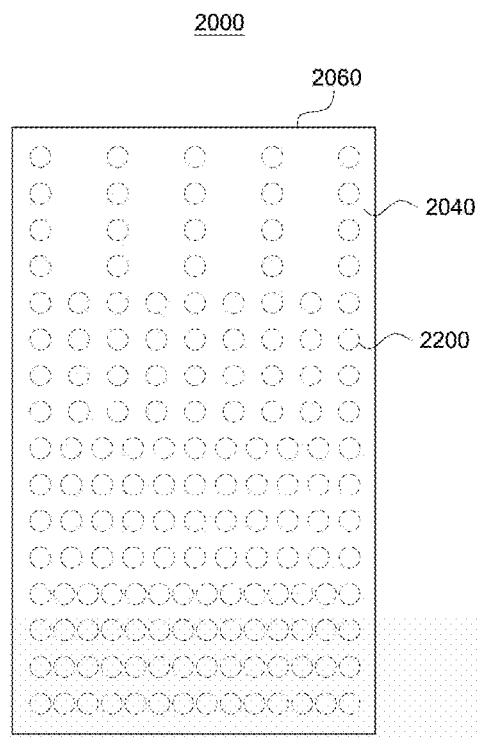
FIG. 5 is a rear view of the light guide plate in which the density of the reflection patterns according to one embodiment of the present invention is non-uniform.
Figure 6:
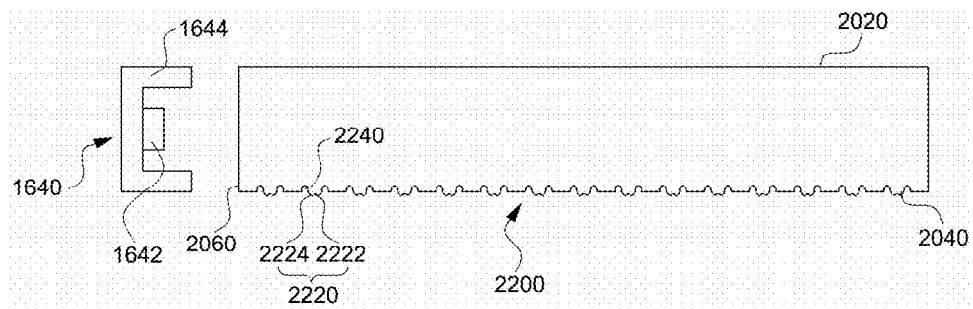
FIG. 6 is a cross-sectional view of the light guide plate according to one embodiment of the present invention.
Figure 7:
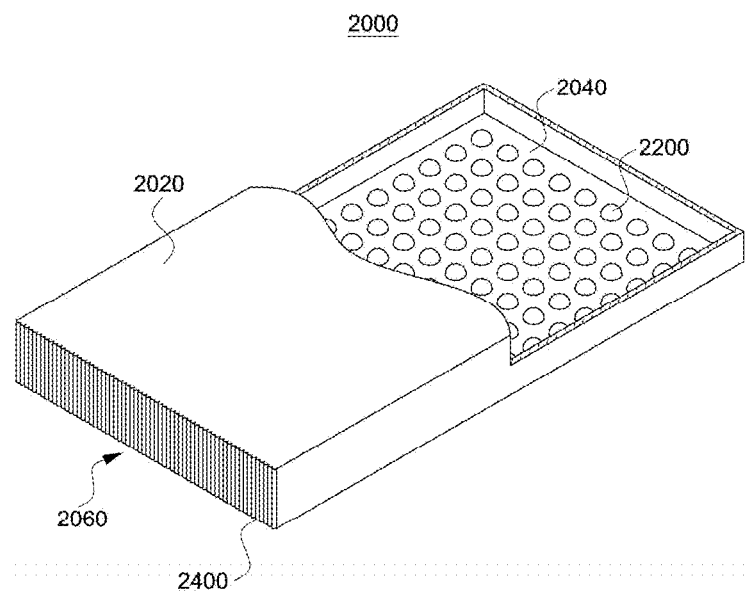
FIG. 7 is a perspective view of the light guide plate of which a light incident surface according to one embodiment of the present invention has a pattern.
Figure 8:
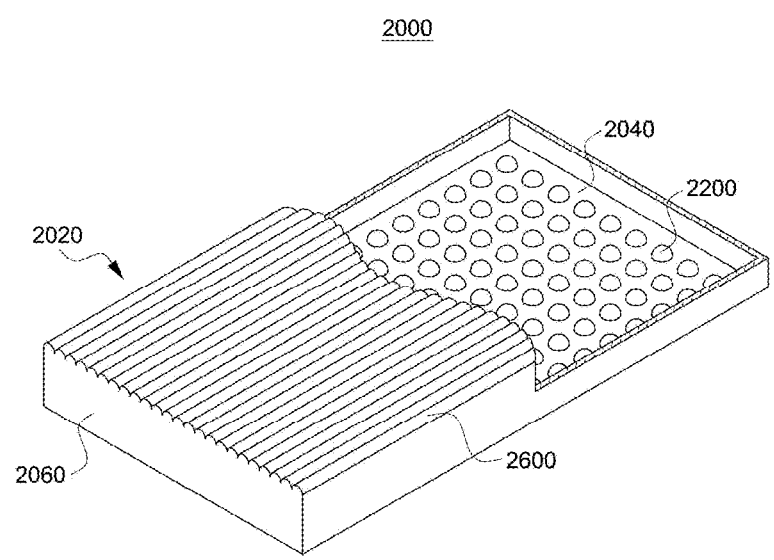
FIG. 8 is a perspective view of the light guide plate of which a light output surface according to one embodiment of the present invention has a pattern.

FIG. 3 is a perspective view of the light guide plate 2000 according to one embodiment of the present invention, FIG. 4 is a rear view of the light guide plate 2000 in which the density of reflection patterns 2200 according to one embodiment of the present invention is uniform, FIG. 5 is a rear view of a light guide plate 2000 in which the density of the reflection patterns 2200 according to one embodiment of the present invention is non-uniform, FIG. 6 is a cross-sectional view of the light guide plate 2000 according to one embodiment of the present invention, FIG. 7 is a perspective view of the light guide plate 2000 of which a light incident surface 2060 according to one embodiment of the present invention has a pattern, and FIG. 8 is a perspective view of the light guide plate 2000 of which a light output surface 2020 according to one embodiment of the present invention has a pattern.

Referring to FIGS. 3, 4, 5, 6, 7 and 8, the light guide plate 2000 may be provided in a plate shape. Thus, the light guide plate 2000 may have a pair of primary surfaces and side surfaces which connect the primary surfaces. An upper surface of the pair of primary surfaces close to the display panel 1400 is a light output surface 2020 which outputs light to the display panel 1400, and the opposite surface thereof is a reflective surface 2040 which reflects light. Further, at least one surface of the side surfaces is disposed to face the light source 1642 and is the light incident surface 2060 which receives light. Generally, since the display device 1000 has a tetragonal screen, the light guide plate 2000 may also have a shape of a tetragonal plate corresponding thereto. In the case of the light guide plate 2000 in a shape of a tetragonal plate, any one surface, a pair of vertically facing surfaces, or a pair of laterally facing surfaces of four side surfaces may become the light incident surface 2060. Meanwhile, FIG. 3 illustrates that the light guide plate 2000 is a planar plate of which the thickness is entirely uniform, but the present invention is not limited thereto. For example, in the light guide plate 2000, it is possible that portions around a side surface thereof facing the light source 1642 may be thicker than other portions thereof to improve the efficiency of incident light.

The light guide plate 2000 receives light projected from the light source 1642 through the light incident surface 2060 and the light is guided by the light guide plate 2000 to be output in a face form of the light source 1642 through the light output surface 2020. The reflective surface 2040 serves to reflect light moved to a rear surface of the light guide plate 2000 to the light output surface 2020. Patterns for effectively receiving, guiding, and reflecting light may be respectively formed on the light incident surface 2060, the light output surface 2020, and the reflective surface 2040, and particularly, the reflection pattern 2200 may be formed on the reflective surface 2040 to reflect light moved to the rear surface of the light guide plate 2000, i.e., moved to the reflective surface 2040.

A plurality of reflection patterns 2200 may be formed on the reflective surface 2040. Here, the reflection patterns 2200 may be formed on the reflective surface 2040 with uniform density as shown in FIG. 4 or may be formed with non-uniform density as shown in FIG. 5. Particularly, in the case of a large screen, a difference of luminance between a region close to the light incident surface 2060 of the light guide plate 2000 and a region far therefrom may be generated, but the difference of luminance may be reduced by forming the reflection patterns 2200 more densely on the region far from the light incident surface 2060 than the region close thereto. Here, the density of the reflection patterns 2200 may be defined by a cover rate which means a ratio of the reflection patterns 2200 to the reflective surface 2040, a size of the reflection pattern 2200, an interval of the reflection patterns 2200, etc.

The reflection pattern 2200 may be formed by a silk screening technique, a printing technique or laser etching technique, a deposition technique, a pressing technique, a roll stamping technique, etc. The reflection pattern 2200 may be formed in a specific form to effectively refract or reflect light moved to the rear surface of the light guide plate 2000 to the light output surface 2020 by the above-described process and detailed descriptions for the formation of the reflection pattern 2200 will be described below.

Meanwhile, a serration pattern 2400 may be formed on the light incident surface 2060 of the light guide plate 2000 to improve a distribution angle of light incident from the light source 1642 and to increase a diffusion effect. The serration pattern 2400 may be formed on the light incident surface 2060 so that an embossed portion and a concave portion extending in a vertical direction as shown in FIG. 7 are repeatedly disposed in a direction of the width of the light incident surface 2060. Further, a light guide pattern 2600 for guiding light incident through the light incident surface 2060 to all regions of the light guide plate 2000 may be formed on the light output surface 2020 of the light guide plate 2000. The light guide pattern 2600 may be repeatedly formed on the light output surface 2020 to extend in a direction perpendicular to the light incident surface 2060, and may have a lenticular pattern form as shown in FIG. 8 or may be formed in a trigonal or tetragonal prism pattern form.

The above-described serration pattern 2400 or light guide pattern 2600 may be provided to the light guide plate 2000 with the reflection pattern 2200, and in some cases, all of the serration pattern 2400, the light guide pattern 2600, and the reflection pattern 2200 may be formed on the light guide plate 2000.

Hereinafter, the reflection pattern 2200 according to one embodiment of the present invention will be described.

The reflection pattern 2200 is formed in a specific form by protruding from or being recessed in the reflective surface 2040, and thus light moved to the rear surface of the light guide plate 2000 may be reflected. When the light is reflected as described above, an amount of light output through the light output surface 2020 of the light guide plate 2000 is eventually increased, and thus the luminance of the display device 1000 can be increased.

In the embodiment of the present invention, the reflection pattern 2200 may be basically provided in a dot pattern form. The entire reflection pattern 2200 may have a region protruding from the reflective surface 2040 in a circular shape, and a recessed region surrounding the protruding region.

The reflection pattern 2200 may be mainly formed by roll stamping or pressing. Specifically, the recessed region may be formed by pressuring the reflective surface 2040 using the roll stamping or pressing, and the protruding region may be formed because a material in the recessed region is moved to the vicinity thereof. At this time, the roll stamping or pressing using a thermal pressing method can effectively perform the above patterning process.

The reflection pattern 2200 reflects, refracts, or scatters light which is incident from the light incident surface 2060 and moved to the reflective surface 2040, or light which is reflected from the light output surface 2020 and moved to the reflective surface 2040 in each region, and thus light can be effectively reflected. Specifically, the reflection pattern 2200 doubly changes a path of light by an embossed portion 2220 located at the center thereof and a concave portion 2240 surrounding the embossed portion 2220, thereby the luminance uniformity of the entire light output surface 2020 can be increased.

Hereinafter, a first sample of various forms for the reflection pattern 2200 according to one embodiment of the present invention will be described.

Figure 9:
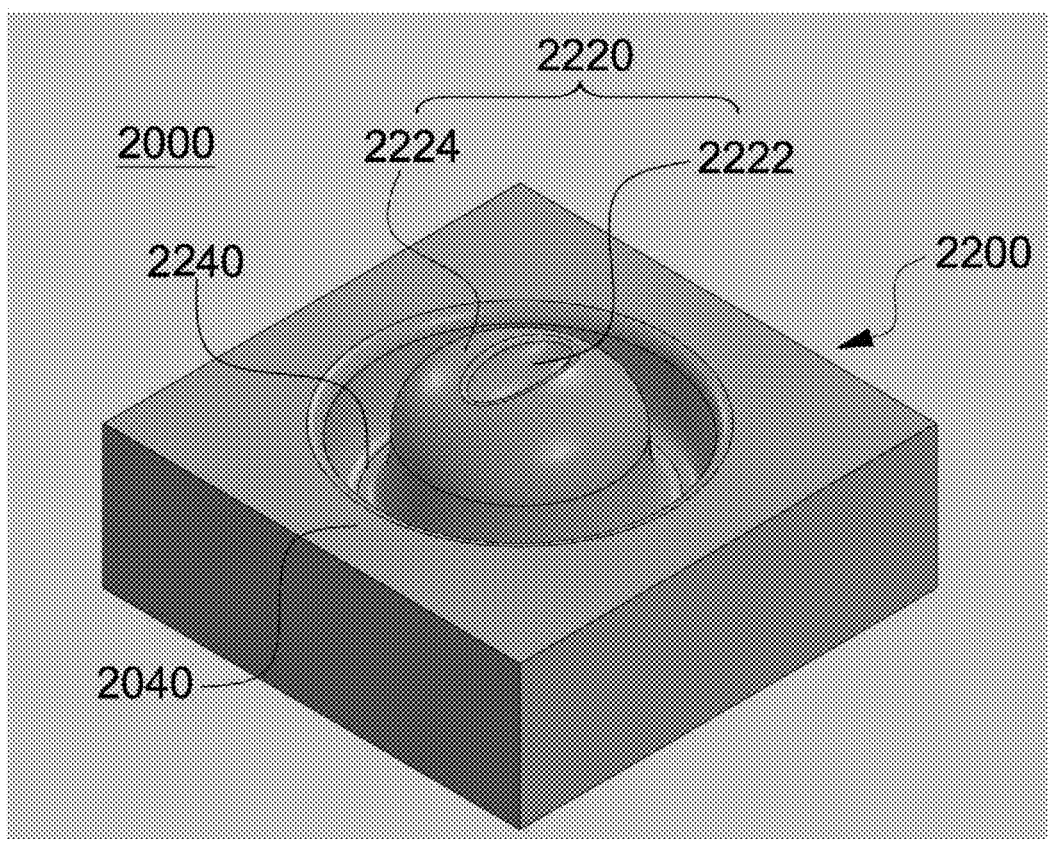
FIG. 9 is a perspective view of a first sample of a reflection pattern according to one embodiment of the present invention.
Figure 10:
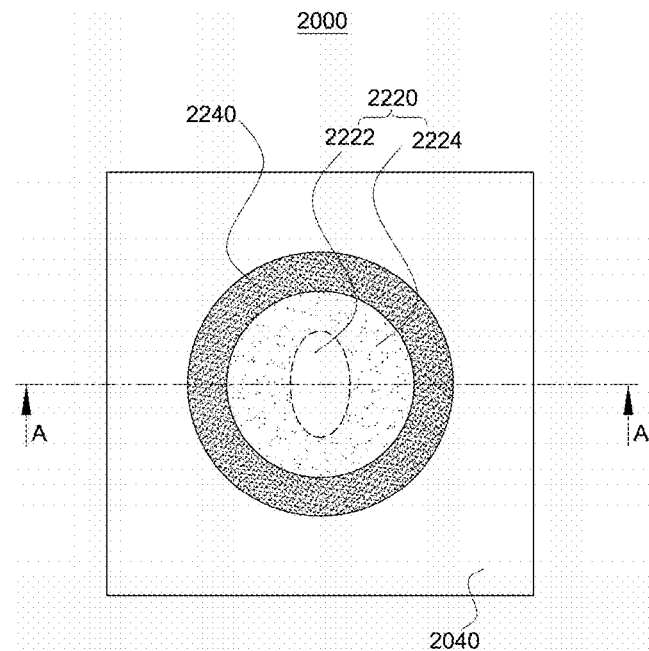
FIG. 10 is a plan view of the first sample of the reflection pattern according to one embodiment of the present invention.
Figure 11:
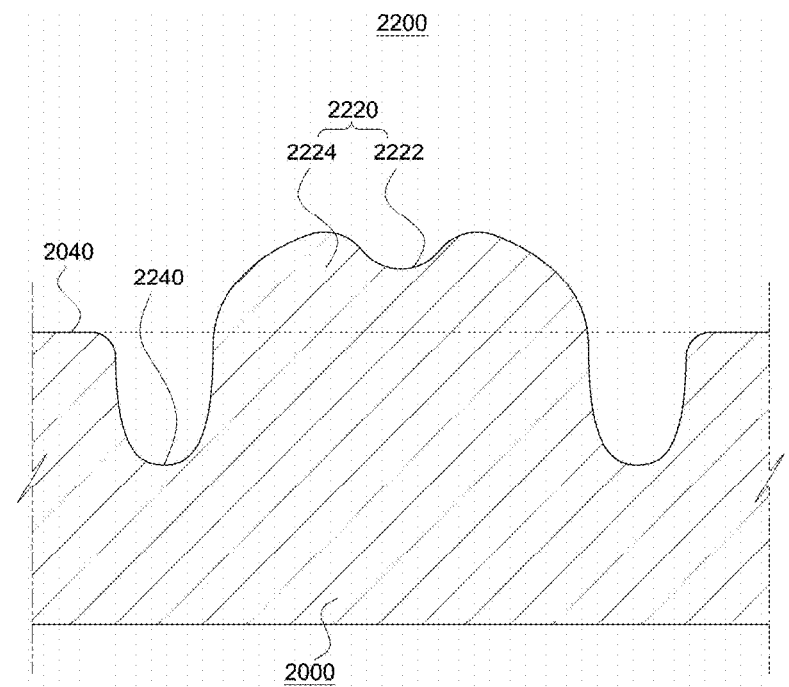
FIG. 11 is a cross-sectional view of the first sample of the reflection pattern according to one embodiment of the present invention.

FIG. 9 is a perspective view of the first sample of the reflection pattern 2200 according to one embodiment of the present invention, FIG. 10 is a plan view of the first sample of the reflection pattern 2200 according to one embodiment of the present invention, and FIG. 11 is a cross-sectional view of the first sample of the reflection pattern 2200 according to one embodiment of the present invention.

Referring to FIGS. 9, 10 and 11, a first form of the reflection pattern 2200 according to one embodiment of the present invention may include an embossed portion 2220 and a concave portion 2240.

The embossed portion 2220 is positioned at the center of the reflection pattern 2200 and is a portion protruding to the outside of a level of the reflective surface 2040. Here, the embossed portion 2220 may be formed with a recessed region 2222 recessed in the center thereof.

In the first form of the reflection pattern 2200, the embossed portion 2220 may be formed in a circular shape when viewed in a direction perpendicular to the reflective surface 2040. Further, the three-dimensional shape thereof may have a hemisphere shape. That is, embossed portion 2220 may have a shape in which a height thereof is increased from an edge thereof (i.e., a boundary in contact with the concave portion 2240) to the center thereof.

The recessed region 2222 may be formed in the center of the reflection pattern 2200. The recessed region 2222 may be formed by recessing a center portion of a surface 2224 of the reflection pattern 2200 in a hemisphere shape in which a height is increased in the center portion thereof.

The recessed region 2222 may be formed in an elliptical shape when viewed in a direction perpendicular to the reflective surface 2040. However, the recessed region 2222 does not have to be the elliptical shape, and any type of shapes is acceptable when it has a major axis and a minor axis. For example, the recessed region 2222 may be formed in various shapes such as a lined elliptical shape, a long hole shape, etc. Meanwhile, the major axis of the recessed region 2222 may be formed to pass through the center of the embossed portion 2220.

Further, the recessed region 2222 may be recessed from a boundary thereof toward the center of the reflection pattern 2200 and may be formed in a shape in which a depth is gradually increased. Here, the lowest point of the recessed region 2222 may be formed higher than the level of the reflective surface 2040. Further, a planar plane may be formed in a center portion of the recessed region 2222. A height of an inner circumference of the concave portion 2240 (i.e., a boundary connected to the embossed portion 2220) is flush with the level of the reflective surface 2040, a depth thereof is gradually increased to a maximum depth from the inner circumference in a predetermined distance in proportion to a distance from the inner circumference, and the depth is gradually decreased with the approach to an outer circumference (i.e., a boundary connected to the outer portion 2260) after a portion at the maximum depth is passed, and thus a height of the outer circumference may be flush with the level of the reflective surface 2040. Here, a planar portion having a uniform depth may be provided at the portion having the maximum depth. Further, in the concave portion 2240, a slope of a portion near the inner circumference may be formed to be greater than that of a portion near the outer circumference. For example, in a cross sectional view, the concave portion 2240 may be recessed from the level of the reflective surface 2040 in a curved surface shape such as a circular arc shape, an elliptical arc shape, a parabolic shape, etc. The concave portion 2240 of which a surface is processed in the curved shape as described above may have an advantageous effect of easily refracting, scattering, or reflecting incident light in a wide range.

Hereinafter, a second sample of various forms for the reflection pattern 2200 according to one embodiment of the present invention will be described.

Figure 12:
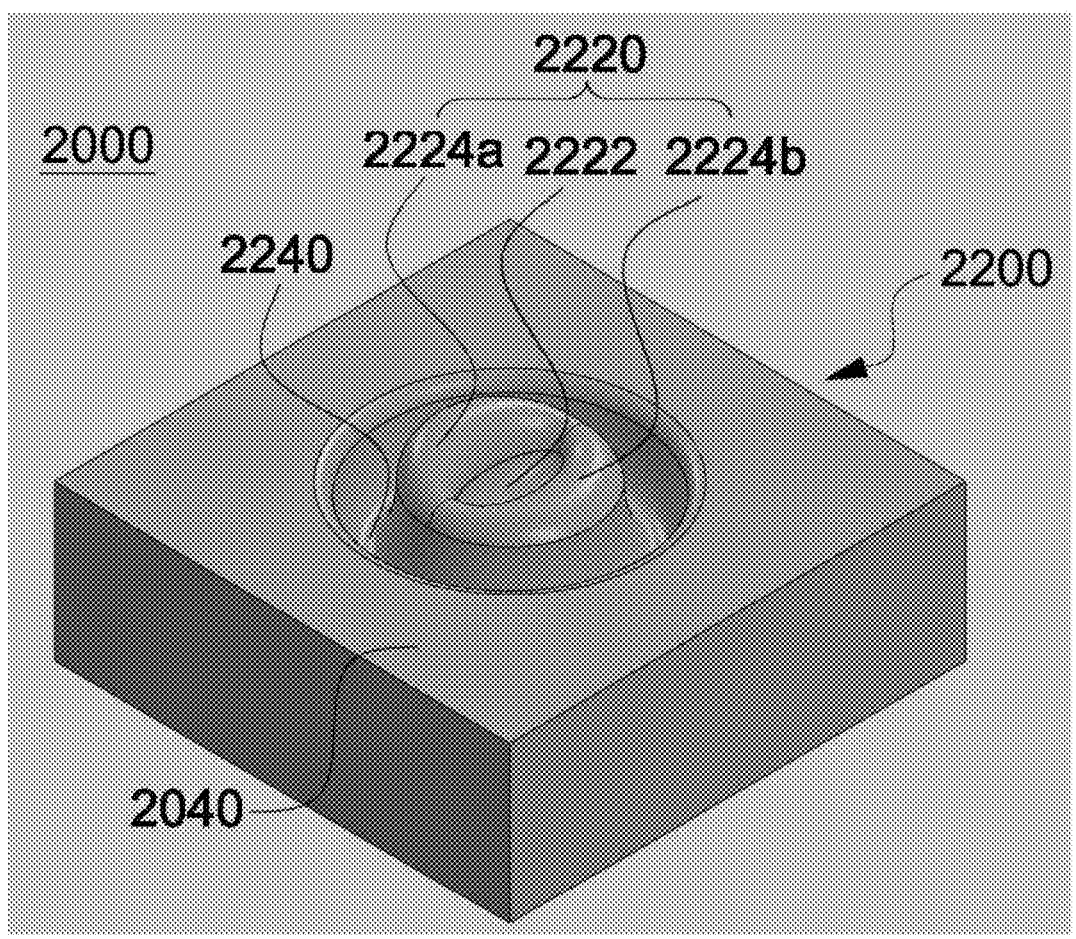
FIG. 12 is a perspective view of a second sample of a reflection pattern according to one embodiment of the present invention.
Figure 13:
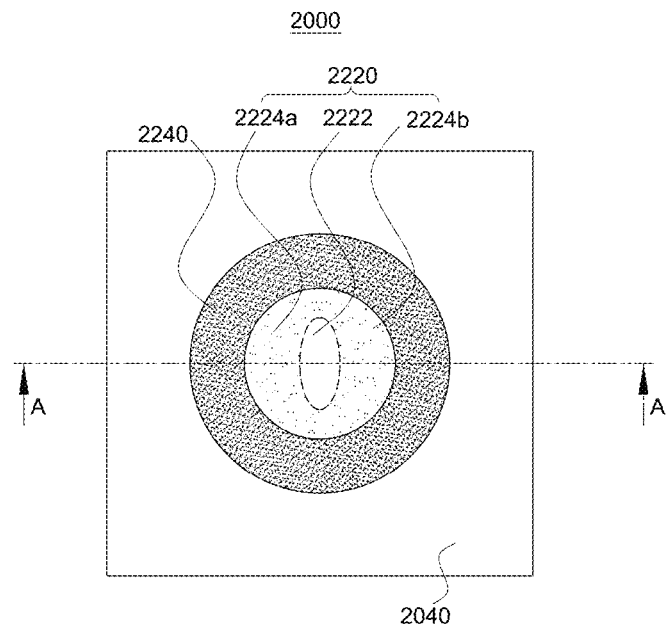
FIG. 13 is a plan view of the second sample of the reflection pattern according to one embodiment of the present invention.
Figure 14:
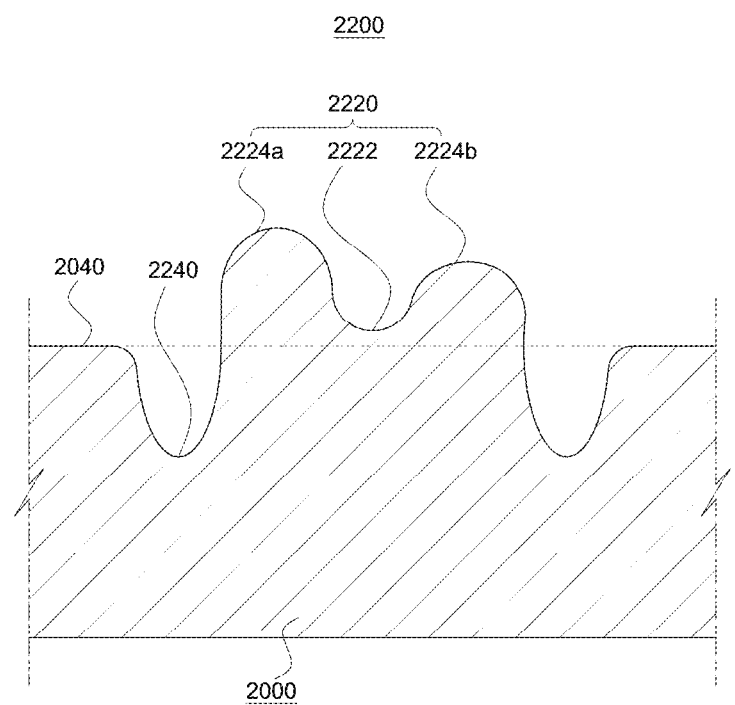
FIG. 14 is a cross-sectional view of the second sample of the reflection pattern according to one embodiment of the present invention.
Figure 15:
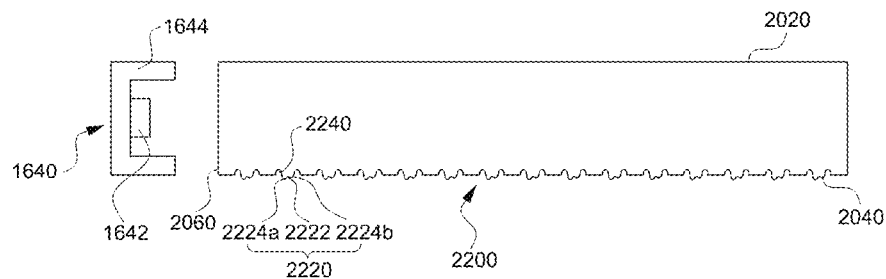
FIG. 15 is a cross-sectional view of a light guide plate having an unsymmetrical reflection pattern according to one embodiment of the present invention.

FIG. 12 is a perspective view of the second sample of the reflection pattern 2200 according to one embodiment of the present invention, FIG. 13 is a plan view of the second sample of the reflection pattern 2200 according to one embodiment of the present invention, FIG. 14 is a cross-sectional view of the second sample of the reflection pattern 2200 according to one embodiment of the present invention, and FIG. 15 is a cross-sectional view of the light guide plate 2000 having the unsymmetrical reflection pattern 2200 according to one embodiment of the present invention.

Referring to FIGS. 12, 13 and 14, a second form of the reflection pattern 2200 according to one embodiment of the present invention may include an embossed portion 2220 and a concave portion 2240 similar to the first form. However, the embossed portion 2220 is symmetrically formed based on the recessed region 2222 in the first form, whereas the embossed portion 2220 may be unsymmetrically formed based on the recessed region 2222 in the second form. Since the shape of the concave portion 2240 of the reflection pattern 2200 in the second form may be generally similar to the shape of the concave portion 2240 of the reflection pattern 2200 in the first form, the description thereof will be omitted.

In the second form of the reflection pattern 2200, the embossed portion 2220 may be unsymmetrically formed based on the recessed region 2222, and as shown in FIGS. 12 and 14, a maximum height thereof in one direction may be the greatest and is gradually decreased to the smallest in an opposite direction in a cross sectional view. Here, a region having a relatively great height may be a first protruding region 2224a, and a region having a relatively small height may be a second protruding region 2224b. The height is decreased from the first protruding region 2224a toward the second protruding region 2224b, and may be the smallest in the second protruding region 2224b. Further, an interval between the recessed region 2222 and the concave portion 2240 in the first protruding region 2224a may be the same as an interval between the recessed region 2222 and the concave portion 2240 in the second protruding region 2224b.

Since the shape of the second form of the reflection pattern 2200 is unsymmetrical, the optical characteristics thereof may be shown to be anisotropic rather than isotropic. In detail, the first protruding region 2224a has a stronger effect of light scattering than the second protruding region 2224b. Further, the second protruding region 2224b may provide a better viewing angle than the first protruding region 2224a. Accordingly, when the anisotropic optical characteristics are used, the luminance uniformity or viewing angle of the display device 1000 can be improved.

Meanwhile, referring to FIG. 15, a plurality of reflection patterns 2200 may be formed on the reflective surface 2040. The first protruding region 2224a may be formed on the light incident surface 2060 in the second form of the reflection pattern 2200. Accordingly, a height of the protruding region 2224 in one reflection pattern 2200 may be decreased in proportion to a distance from the light incident surface 2060.

In the reflection pattern 2200, a portion having a great height of the embossed portion 2220 in one direction may be disposed on the reflective surface 2040 in a direction close to the light incident surface 2060. Generally, light moving to the reflection pattern 2200 is mainly moved from a direction of the light incident surface 2060, and thus a region having the great height of the embossed portion 2220 is disposed in a direction of incident light and effects of light diffusion and scattering of the embossed portion 2220 can be maximized.

Meanwhile, a viewing angle in a lateral direction is more important than a viewing angle in a vertical direction in the display device 1000, and thus, when a portion having the great maximum height of the embossed portion 2220 is disposed in the vertical direction while watching the display device 1000, the degradation of the viewing angle can be prevented. Furthermore, in a vertical viewing angle, according to which viewing angle between a viewing angle in a downward direction and a viewing angle in an upward direction is more important, the portion having the great maximum height of the embossed portion 2220 may be disposed in the upward direction or in the downward direction of the display device 1000.

Meanwhile, to be implemented for securing both of the luminance uniformity and viewing angle of the display device 1000, the light source array 1640 is disposed in the downward direction and the reflection pattern 2200 is formed so that the portion having the great embossed portion 2220 in the reflection pattern 2200 is disposed in the downward direction, and thus both of the luminance uniformity and viewing angle can be realized.

Hereinafter, a third sample of various forms for the reflection pattern 2200 according to one embodiment of the present invention will be described.

Figure 16:
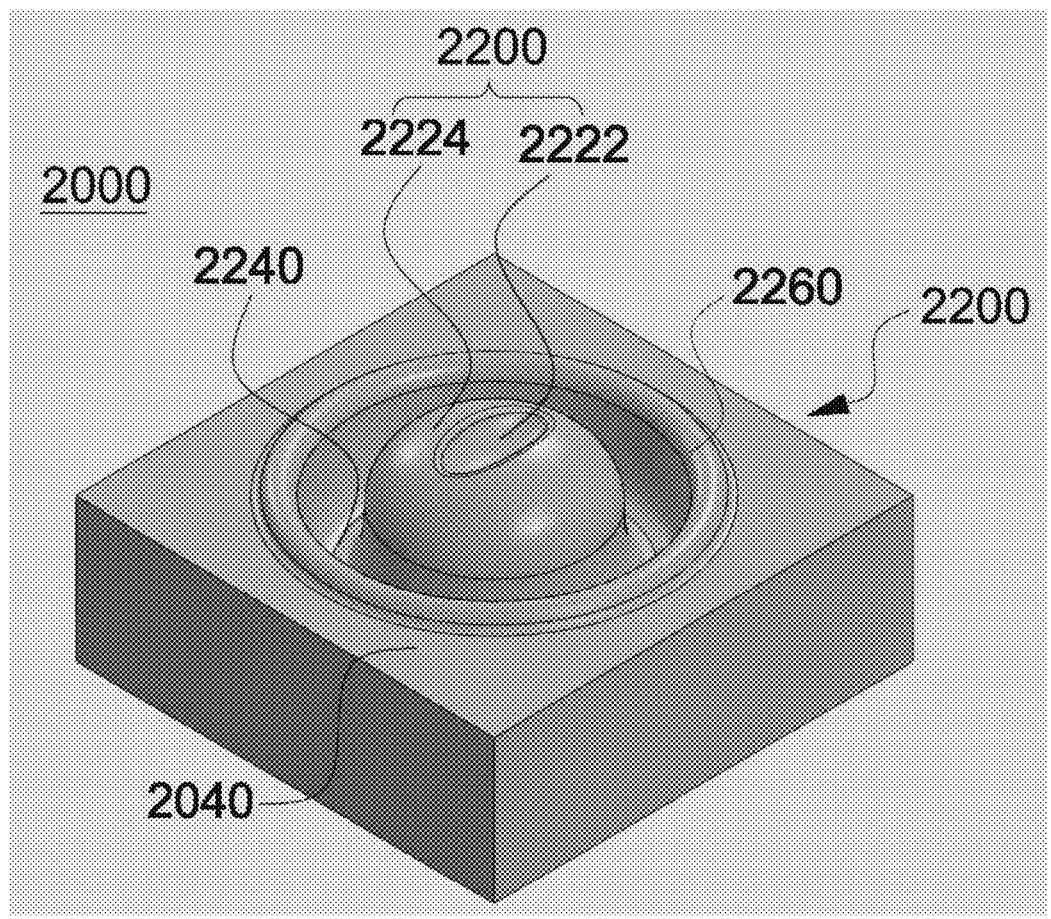
FIG. 16 is a perspective view of a third sample of a reflection pattern according to one embodiment of the present invention.
Figure 17:
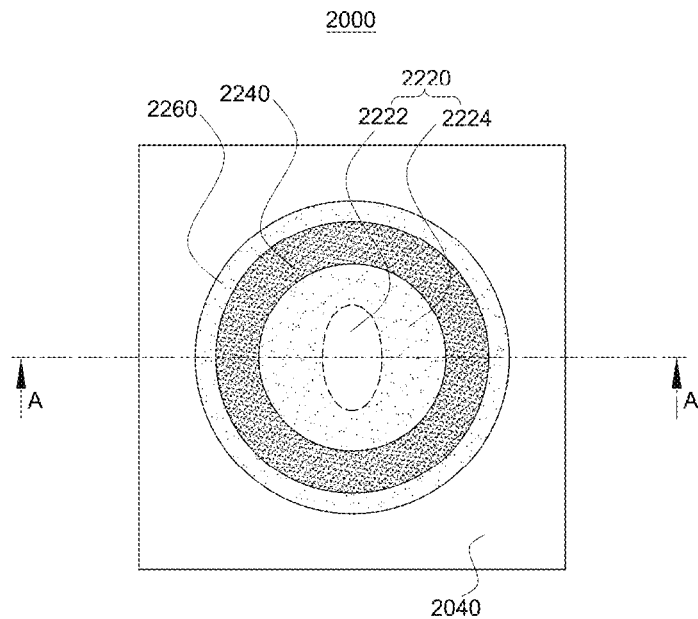
FIG. 17 is a plan view of the third sample of the reflection pattern according to one embodiment of the present invention.
Figure 18:
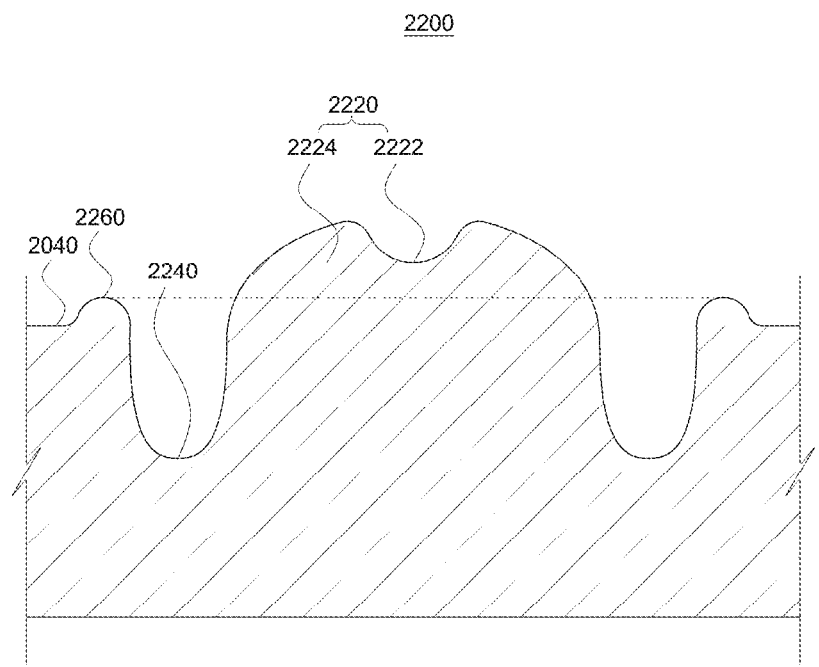
FIG. 18 is a cross-sectional view of the third sample of the reflection pattern according to one embodiment of the present invention.

FIG. 16 is a perspective view of the third sample of the reflection pattern 2200 according to one embodiment of the present invention, FIG. 17 is a plan view of the third sample of the reflection pattern 2200 according to one embodiment of the present invention, and FIG. 18 is a cross-sectional view of the third sample of the reflection pattern 2200 according to one embodiment of the present invention.

Referring to FIGS. 16, 17 and 18, a third form of the reflection pattern 2200 according to one embodiment of the present invention may include an embossed portion 2220 and a concave portion 2240 similar to the first form. However, the embossed portion 2220 and the concave portion 2240 are formed on the reflective surface 2040 in the first form, whereas an outer portion 2260 positioned on the reflection pattern 2200 to surround the concave portion 2240 and configured to protrude to the outside of the level of the reflective surface 2040 may be further included in the third form. Since the shapes of the embossed portion 2220 and the concave portion 2240 in the third form are generally similar to the embossed portion 2220 and the concave portion 2240 of the reflection pattern 2200 in the first form, the descriptions thereof will be omitted.

The outer portion 2260 is positioned to surround the concave portion 2240, and is a portion protruding to the outside of the level of the reflective surface 2040. Here, the outer portion 2260 may be formed in a ring shape when viewed in a direction perpendicular to the reflective surface 2040. The center of the ring forming the outer portion 2260 may be the same as the centers of a circle forming the embossed portion 2220 and the ring forming the concave portion 2240.

In the third form of the reflection pattern 2200, a height of an inner circumference of the outer portion 2260 (i.e., a boundary connected to the concave portion 2240) is flush with the level of the reflective surface 2040, and a height thereof is gradually increased to a maximum height from the inner circumference in a predetermined distance in proportion to a distance from the inner circumference, and after a portion at the maximum height is passed, the height is gradually decreased, and thus the height may be flush with the level of the reflective surface 2040 and an outer circumference thereof may be formed. Here, in the outer portion 2260, a slope of a portion near the inner circumference may be formed to be greater than that of a portion near the outer circumference. For example, in a cross sectional view, the outer portion 2260 may protrude from the level of the reflective surface 2040 in a curved surface shape such as a circular arc shape, an elliptical arc shape, a parabolic shape, etc. The outer portion 2260 of which a surface is processed in the curved shape as described above may have an advantageous effect of easily refracting, scattering, or reflecting incident light in a wide range. Particularly, the outer portion 2260 is disposed as an outermost portion in the reflection pattern 2200 and serves to first scatter light incident on the reflection pattern 2200 so that light reflected by the reflection pattern 2200 is scattered and diffused in a forward direction and guided to the light output surface 2020, and thus the luminance uniformity thereof can be greatly improved.

Meanwhile, the outer portion 2260 of the third form of the reflection pattern 2200 is formed in a ring shape when viewed in a direction perpendicular to reflective surface 2040, but the center of the ring forming the outer portion 2260 may be different from the centers of a circle forming the embossed portion 2220 and the ring forming the concave portion 2240. Since the shape of the outer portion 2260 formed as described above is unsymmetrical, the optical characteristics thereof may be shown to be anisotropic rather than isotropic. In detail, the effect of light scattering is greater in the one direction in which the thickness is great and the maximum height is great than in the opposite direction. A better viewing angle may be provided in the opposite direction compared to in the one direction. Accordingly, when the anisotropic optical characteristics are used, the luminance uniformity or viewing angle of the display device 1000 can be improved.

Hereinafter, a fourth sample of various forms for the reflection pattern 2200 according to one embodiment of the present invention will be described.

Figure 19:
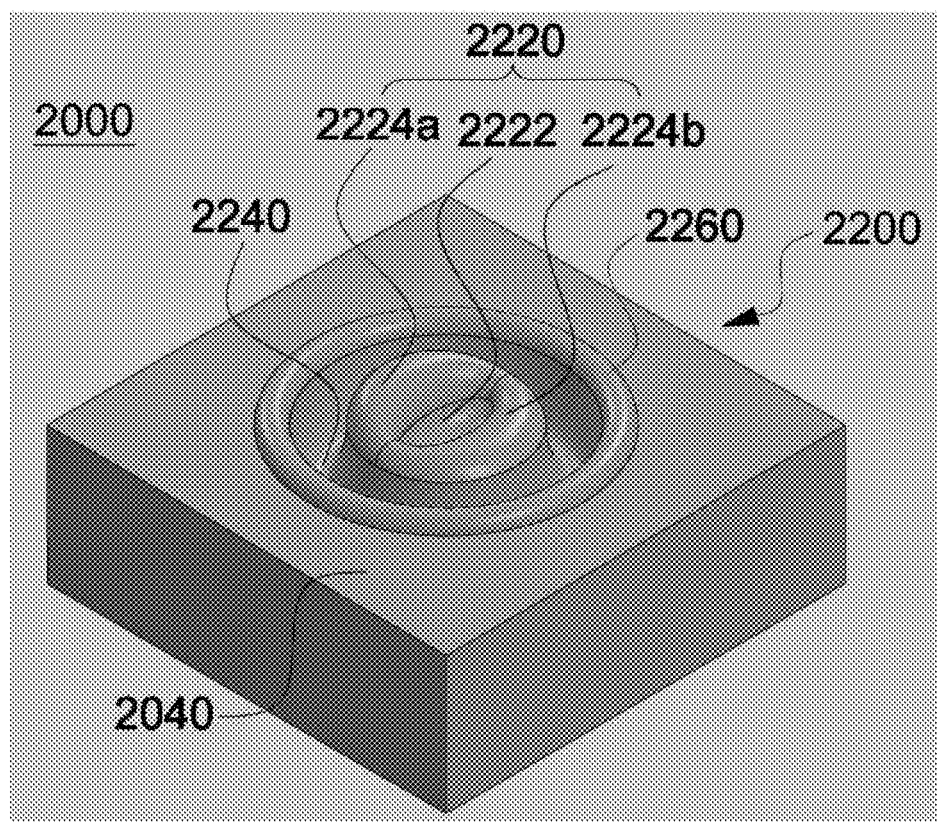
FIG. 19 is a perspective view of a fourth sample of a reflection pattern according to one embodiment of the present invention.
Figure 20:
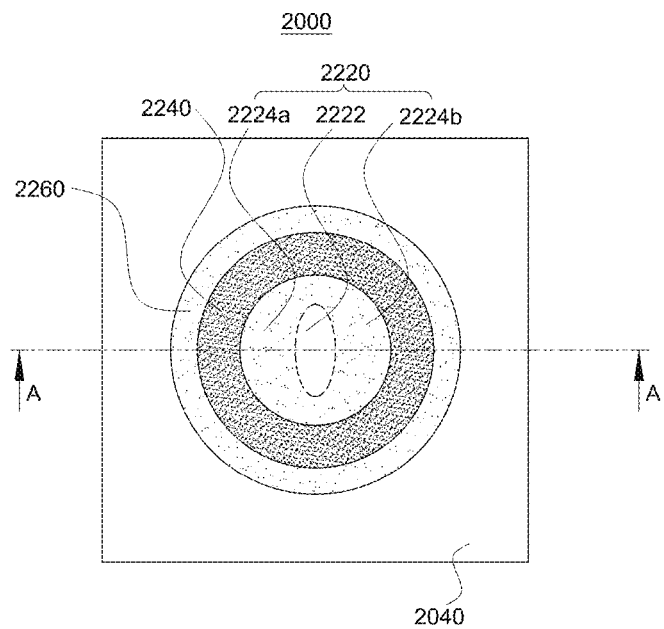
FIG. 20 is a plan view of the fourth sample of the reflection pattern according to one embodiment of the present invention.
Figure 21:
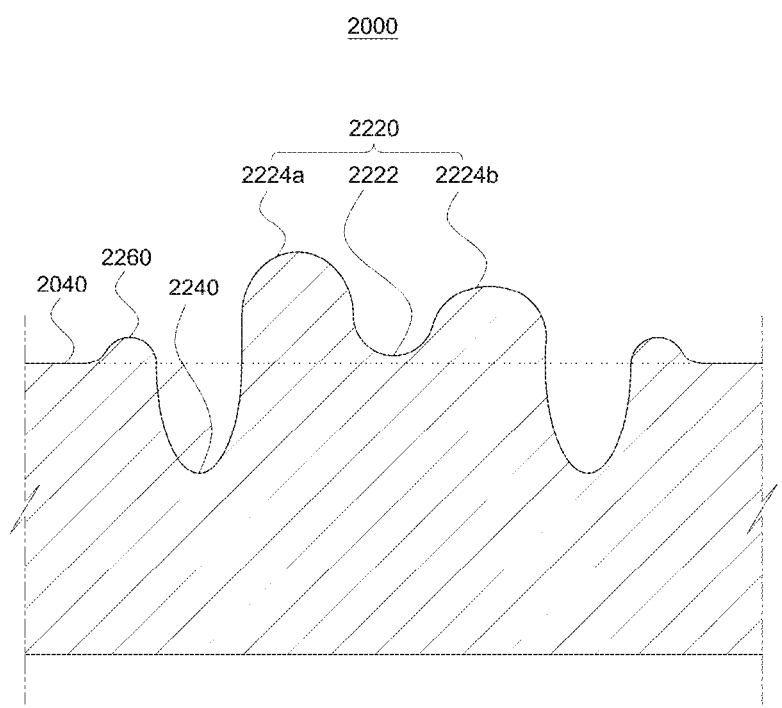
FIG. 21 is a cross-sectional view of the fourth sample of the reflection pattern according to one embodiment of the present invention.

FIG. 19 is a perspective view of the fourth sample of the reflection pattern 2200 according to one embodiment of the present invention, FIG. 20 is a plan view of the fourth sample of the reflection pattern 2200 according to one embodiment of the present invention, and FIG. 21 is a cross-sectional view of the fourth sample of the reflection pattern 2200 according to one embodiment of the present invention.

Referring to FIGS. 19, 20 and 21, a fourth form of the reflection pattern 2200 according to one embodiment of the present invention is similar to the second form and may have an embossed portion 2220 and a concave portion 2240. However, the embossed portion 2220 and the concave portion 2240 are formed on the reflective surface 2040 in the second form, whereas an outer portion 2260 positioned on the reflection pattern 2200 to surround the concave portion 2240 and configured to protrude to the outside of the level of the reflective surface 2040 may be further included in the fourth form. Since the shapes of the embossed portion 2220 and the concave portion 2240 in the fourth form are generally similar to the embossed portion 2220 and the concave portion 2240 of the reflection pattern 2200 in the second form, the descriptions thereof will be omitted.

The outer portion 2260 is positioned to surround the concave portion 2240, and is a portion protruding to the outside of the level of the reflective surface 2040. Here, the outer portion 2260 may be formed in a ring shape when viewed in a direction perpendicular to the reflective surface 2040. The center of the ring forming the outer portion 2260 may be the same as the centers of a circle forming the embossed portion 2220 and the ring of the concave portion 2240.

In the fourth form of the reflection pattern 2200, a height of an inner circumference of the outer portion 2260 (i.e., a boundary connected to the concave portion 2240) is flush with the level of the reflective surface 2040, and a height thereof is gradually increased to a maximum height from the inner circumference in a predetermined distance in proportion to a distance from the inner circumference, and after a portion at the maximum height is passed, the height is gradually decreased, and thus the height may be flush with the level of the reflective surface 2040 and an outer circumference thereof may be formed. Here, in the outer portion 2260, a slope of a portion near the inner circumference may be formed to be greater than that of a portion near the outer circumference. For example, in a cross sectional view, the outer portion 2260 may protrude from the level of the reflective surface 2040 in a curved surface shape such as a circular arc shape, an elliptical arc shape, a parabolic shape, etc. The outer portion 2260 of which a surface is processed in the curved shape as described above may have an advantageous effect of easily refracting, scattering, or reflecting incident light in a wide range. Particularly, the outer portion 2260 is disposed as an outermost portion in the reflection pattern 2200 and serves to first scatter light incident on the reflection pattern 2200 so that light reflected by the reflection pattern 2200 is scattered and diffused in a forward direction and guided to the light output surface 2020, and thus the luminance uniformity thereof can be greatly improved.

Meanwhile, the outer portion 2260 of the fourth form of the reflection pattern 2200 is formed in a ring shape when viewed in a direction perpendicular to reflective surface 2040, but the center of the ring forming the outer portion 2260 may be different from the centers of a circle forming the embossed portion 2220 and the ring forming the concave portion 2240. Since the shape of the outer portion 2260 formed as described above is unsymmetrical, the optical characteristics thereof may be shown to be anisotropic rather than isotropic. In detail, the effect of light scattering is greater in the one direction in which the thickness is great and the maximum height is great than in the opposite direction. A better viewing angle may be provided in the opposite direction compared to in the one direction. Accordingly, when the anisotropic optical characteristics are used, the luminance uniformity or viewing angle of the display device 1000 can be improved.

In the above-described reflection pattern 2200 according to one embodiment of the present invention, when comparing distances in a vertical direction (i.e., an absolute value of a height or depth), the maximum depth of the concave portion 2240 is the greatest, the maximum height of the embossed portion 2220 is the next greatest, and the maximum height of the outer portion 2260 may be the smallest. In detail, the height of the embossed portion 2220 may be approximately 1.2 to 8 times the height of the outer portion 2260, and the depth of the concave portion 2240 may be approximately 2 to 14 times the height of the outer portion 2260. Meanwhile, when comparing a recessed region 2222 of the embossed portion 2220 and the outer portion 2260, a height of the lowest point of the recessed region 2222 is greater than the highest point of the outer portion 2260. A depth from the highest point of the embossed portion 2220 to a recessed depth of the recessed region 2222 may be approximately 0.8 to 5 time the height of the outer portion 2260.

Further, in the reflection pattern 2200, a diameter of the embossed portion 2220 may be approximately 60 to 85% of an overall diameter, an outer diameter of the concave portion 2240 may be approximately 80 to 98% thereof, and an outer diameter of the outer portion 2260 may be approximately 85 to 100% thereof. Further, in the reflection pattern 2200, an area of the recessed region 2222, i.e., an area of a region having a negative slope in the embossed portion 2220, may be approximately 20 to 40% of an overall area.

For example, in the reflection pattern 2200, the embossed portion 2220 may be formed to have a maximum height in a range of 1 to 7 µm, and a diameter (i.e., two times a radius which is a distance from the center of the reflection pattern 2200 to a point of which a height is flush with the level of the reflective surface 2040) in a range of 35 to 55 µm, the recessed depth in the recessed region 2222, i.e., a difference between the highest point and the lowest point of the embossed portion 2220, may be formed in a range of 0.3 to 4 µm, the concave portion 2240 may be formed to have a maximum depth in a range of 2 to 13 µm and an outer diameter (i.e., two times a distance from the center of the reflection pattern 2200 to a point of which a height is flush with the level of the reflective surface 2040) in a range of 40 to 65 µm, and the outer portion 2260 may be formed to have a maximum height in a range of 0.5 to 5 µm and an outer diameter (i.e., two times a distance from the center of the reflection pattern 2200 to a point of which a height is flush with the level of the reflective surface 2040) in a range of 40 to 70 µm.

Further, when the reflection pattern 2200 may be formed in a curved surface shape, a slope angle at a portion in which the concave portion 2240 is connected to the outer portion 2260 may be the greatest, a slope angle at a portion in which the embossed portion 2220 is connected to the concave portion 2240 may be the next greatest, and a slope angle at a portion in which the outer portion 2260 is connected to the level of the reflective surface 2040 may be the smallest when comparing slope angles at each portion.

Further, the above drawings illustrate the smooth surface of the reflection pattern 2200, but the surface of the reflection pattern 2200 may have a predetermined roughness, and particularly, the concave portion 2240 and the outer portion 2260 may have a roughness having a predetermined value or more.

However, in the above descriptions, the specifications of the reflection pattern 2200 are not limited to the above-described height, depth, diameter, slope angle, roughness, etc., and it should be noted that they are suitably changeable if needed.

All of the reflection patterns 2200 formed on the reflective surface 2040 may be formed to have substantially the same specifications or different specifications of the reflection pattern 2200 based on portions of the reflective surface 2040 if needed. For example, when all of the reflection patterns 2200 are formed with the same specifications, there are advantages for manufacturing, and thus a production cost can be reduced. In the reverse case, when the diameter of the reflection pattern 2200 is adjusted to be small with the approach to the light incident surface 2060, the luminance uniformity of the entire light output surface 2020 of the light guide plate 2000 can be improved.

The foregoing is illustrative of embodiments and is not to be construed as limiting thereof. Although a few embodiments have been described, those skilled in the art will

| Glossary | |
| --- | --- |
| 1000: display device | 1200: housing |
| 1400: display panel | 1600: backlight unit |
| 2000: light guide plate | 2200: reflection pattern |
| 2220: embossed portion | 2222: recessed region |
| 2240: concave portion | 2260: outer portion |

What is claimed is:

1. A light guide plate comprising:
a light output surface configured to output light to the outside;
a reflective surface positioned opposite the light output surface;
a light incident surface provided on at least one side surface of side surfaces which connect the light output surface and the reflective surface, and configured to receive light projected from a light source; and
a reflection pattern having an embossed portion formed to protrude to the outside of the reflective surface and a concave portion having a ring shape which surrounds the embossed portion and recessed in the reflective surface and an outer portion having a ring shape which surrounds the concave portion when viewed in a direction perpendicular to the reflective surface, the outer portion protruding from the reflective surface to the outside,
wherein the recessed region is in a shape having a major axis and a minor axis when viewed in a direction perpendicular to the reflective surface,
wherein in the embossed portion, a protruding height of one side and a protruding height of the other side are different based on the recessed region in each cross sectional view perpendicular to the reflective surface and the major axis of the recessed region,
wherein a side having the higher protruding height is positioned close to the light incident surface, and
wherein the center of the ring forming the outer portion is different from the centers of a circle forming the embossed portion and the ring forming the concave portion.

2. The light guide plate of claim 1, wherein the recessed region is formed in a substantially elliptical shape when viewed in a direction perpendicular to the reflective surface.

3. The light guide plate of claim 1, wherein the major axis of the recessed region passes through the center of the embossed portion when viewed in a direction perpendicular to the reflective surface.

4. The light guide plate of claim 1, wherein the major axis of the recessed region is separated from the center of the embossed portion in a predetermined distance when viewed in a direction perpendicular to the reflective surface.

5. The light guide plate of claim 1, wherein:
the major axis of the recessed region is parallel to the light incident surface.

6. The light guide plate of claim 1, wherein the lowest point of the recessed region is positioned higher than the reflective surface.

7. A backlight unit comprising:
a light source configured to project light; and
a light guide plate,
wherein the light guide plate includes a light incident surface which faces the light source and receives the light projected from the light source, a light output surface which is perpendicular to the light incident surface and outputs the light to the outside, and a reflective surface opposite the light output surface, and a reflection pattern provided on the reflective surface,
wherein the reflection pattern includes an embossed portion having a circular shape and configured to protrude from the reflective surface when viewed in a direction perpendicular to the reflective surface, and a concave portion having a ring shape which surrounds the embossed portion and recessed in the reflective surface when viewed in a direction perpendicular to the reflective surface, and an outer portion having a ring shape which surrounds the concave portion when viewed in a direction perpendicular to the reflective surface, the outer portion protruding from the reflective surface to the outside,
wherein the embossed portion has a recessed region,
wherein the recessed region is in a shape having a major axis and a minor axis when viewed in a direction perpendicular to the reflective surface,
wherein in the embossed portion, a protruding height of one side and a protruding height of the other side are different based on the recessed region in each cross sectional view perpendicular to the reflective surface and the major axis of the recessed region,
wherein a side having the higher protruding height is positioned close to the light incident surface, and
wherein the center of the ring forming the outer portion is different from the centers of a circle forming the embossed portion and the ring forming the concave portion.

8. The backlight unit of claim 7, wherein the lowest point of the recessed region is positioned higher than the reflective surface.

* * * * *